Oct. 23, 1945.    O. S. CARLISS    2,387,242
MULTIPLE CAPACITY WEIGHING SCALE
Filed July 18, 1942    4 Sheets-Sheet 1
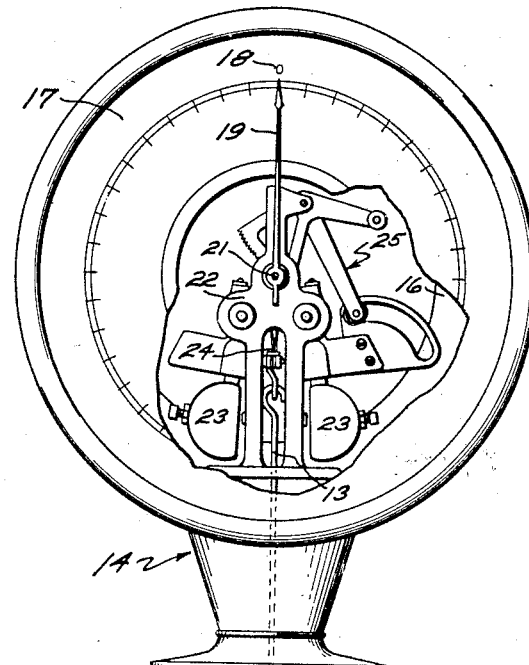
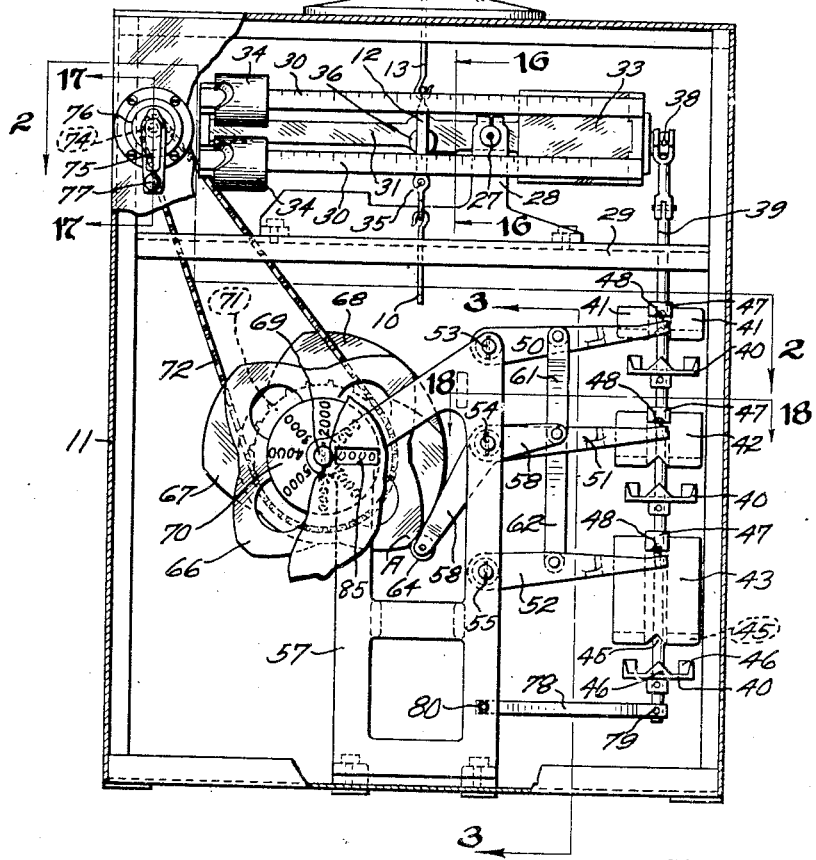
Fig. 1
INVENTOR
Oswald S. Carliss,
BY
ATTORNEY Oct. 23, 1945.   O. S. CARLISS   2,387,242
MULTIPLE CAPACITY WEIGHING SCALE
Filed July 18, 1942    4 Sheets-Sheet 2
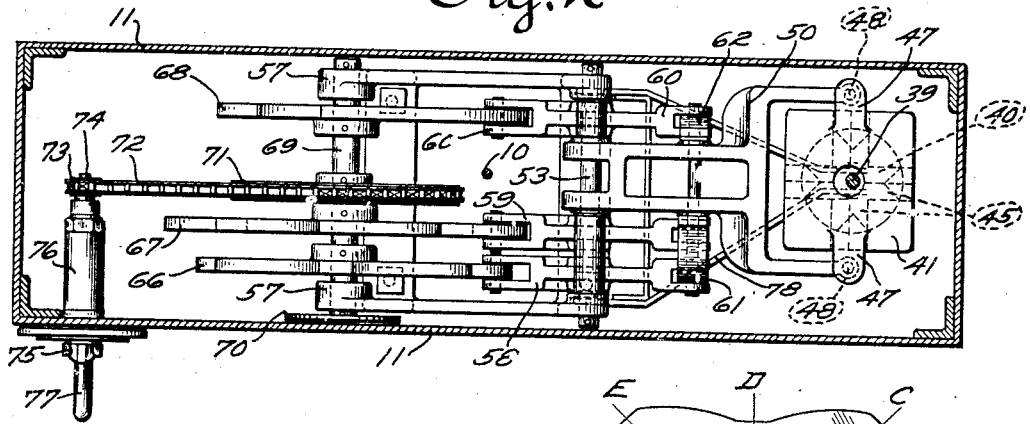
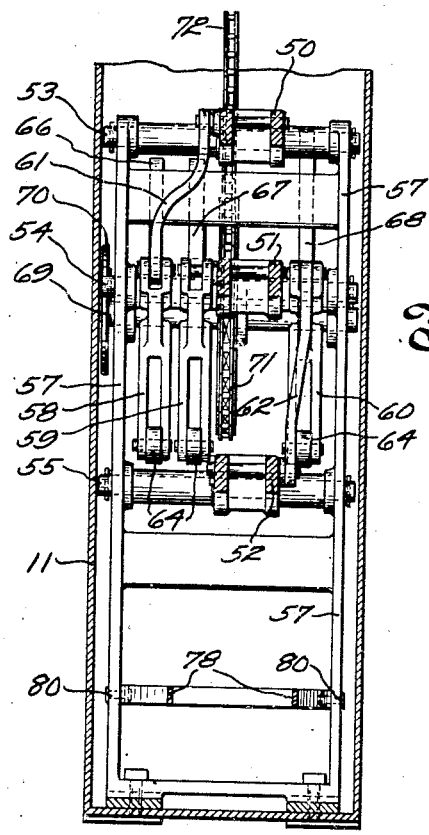
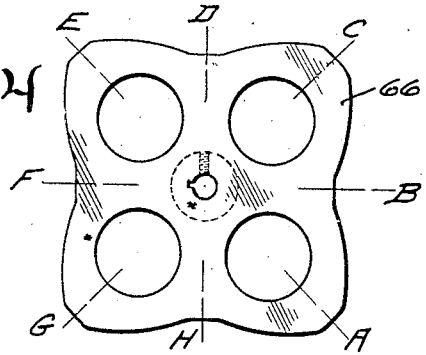
INVENTOR
Oswald S. Carliss,
BY
ATTORNEY Oct. 23, 1945.  O. S. CARLISS  2,387,242

MULTIPLE CAPACITY WEIGHING SCALE

Filed July 18, 1942   4 Sheets-Sheet 3

INVENTOR
Oswald S. Carliss
BY
ATTORNEY

Oct. 23, 1945.   O. S. CARLISS   2,387,242
MULTIPLE CAPACITY WEIGHING SCALE
Filed July 18, 1942    4 Sheets-Sheet 4

INVENTOR
Oswald S. Carliss,
BY
ATTORNEY

Patented Oct. 23, 1945

2,387,242

UNITED STATES PATENT OFFICE 2,387,242

MULTIPLE CAPACITY WEIGHING SCALE

Oswald S. Carliss, Fairfield, Conn., assignor, by mesne assignments, to The Yale & Towne Manufacturing Company, Stamford, Conn., a corporation of Connecticut Application July 18, 1942, Serial No. 451,381

9 Claims. (Cl. 265—48)

This invention relates to the placement and withdrawal of unit weights, sometimes termed unit weights, drop weights or capacity weights, into and out of operative association with some lever or linkage in the weighing mechanism of scales. Such lever may form part of a tare beam structure that is commonly associated with linkage connected between load container and load counterbalancing and weight indicating mechanism of the scale. Selectively placeable and withdrawable unit weights are useful as a convenient means for adding to the normal weighing capacity of automatic load counterbalancing and weight indicating mechanism in an industrial dial scale where loads may be encountered which exceed the normal dial capacity of the scale.

As used in dial scales, unit weights have commonly been handled by separate actuators capable of depositing respectively different unit weights selectively upon a suspension rod that depends from the tare beam structure of the scale. Such rod carries fixedly at different levels suitable platform-like rests, receivers or rosettes, on which the unit weights may selectively be deposited. Unit weights so deposited become an operative factor in the weighing system requiring the application of heavier than normal loads in order to cause any displacement of the weight-indicating pointer from "no-load," or zero, position. The magnitude of the abnormal portion of the load which can be counterbalanced by depositing various numbers of unit weights may be known by observing a shiftable register whose indicia markings exhibit the value of the abnormal or capacity exceeding load factor. Such register may be located so that its reading can be observed in conjunction with the reading of the normal weight indication of the dial pointer.

In such apparatus it has been customary to provide a separate lifter for removing each individual unit weight out of operative relationship to a common tare beam or other common lever in the linkage system, and to provide a separate operating handle for each such lifter. This results not only in a multiplicity of such handles but in a multiplicity of latching or lock-out devices usually associated with the handles for maintaining unused unit weights in inoperative or elevated position.

It is an object of the present improvements to make available a larger selection of unit weight effects upon the balancing system of the scale and at the same time to reduce the number of unit weights employed.

Another object is to reduce the number of parts that comprise the apparatus for handling the unit weights, and to reduce the space required by such apparatus.

A further object is to make use of different combinations of different unit weights of respectively differing mass to produce a variety of load effects upon a lever mechanism in the weighing system.

A related object is to utilize unit weights, which when combined in respectively differing grouping of an equal number of weights, result in respectively different magnitudes of counterbalancing effect in the weighing system.

A further object is to operate all of the unit weights in the above mentioned ways by means of a single progressively advanceable actuator and to enable progressive movement of such actuator through selective different portions of its full range of capacity changing advance to load the unit weight receiving means with respectively different combinations of unit weights. Such actuator may include a progressively turnable control shaft which may be rotated to selective degrees of departure from a starting or zero position by crank operation, or if preferred, may be so rotated by the power of an electric motor that may be stopped at will or from which the control shaft may be declutched at will.

A further object is to make known the aggregate loading effect of the unit weights that are conditioned to be operative in the weighing system through some indicating means that shall move proportionately to the progressive turning of the before mentioned unit weight control shaft.

The above and related objects will appear in greater detail as the description proceeds.

In the appended drawings which illustrate preferred forms of the invention, all figures of the drawings wherein parts are shown to be cross-hatched are viewed as looking in the direction of the arrows applied to the section planes.

Fig. 1 is a front view of a column-like cabinet and superimposed dial-head and weighing mechanism of an industrial weighing scale, showing one form of unit weight applying apparatus incorporating the present improvements.

Fig. 2 is a plan view showing parts in section on the planes 2—2 in Fig. 1.

Fig. 3 is a fragmentary view taken in section on the plane 3—3 in Fig. 1.

Figs. 4, 5 and 6 are front views respectively of the front intermediate and rear cams rotatively positioned as in Fig. 1.

Figs. 7 to 14, inclusive, are isometric representations of the effect of rotation of the cams on each of the unit weights.

Figure 7:
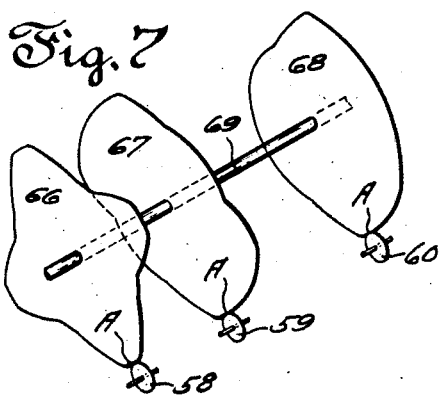
Figure 8:
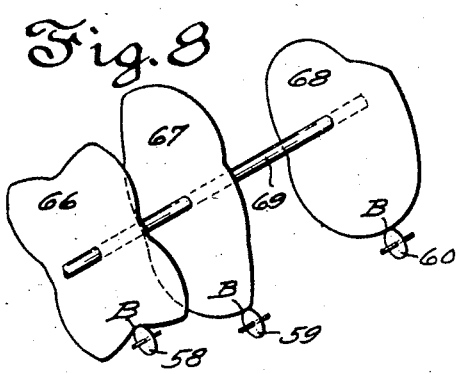
Figure 9:
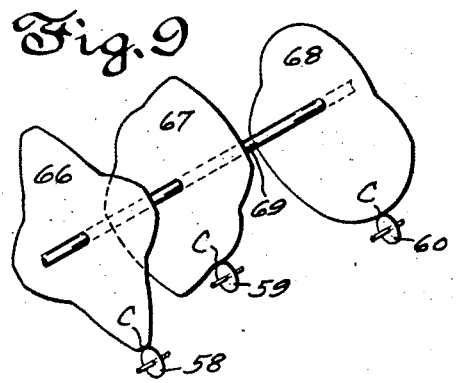
Figure 10:
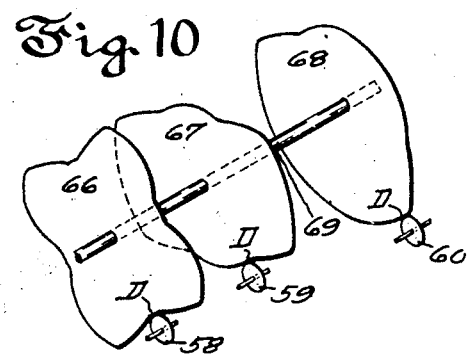
Figure 11:
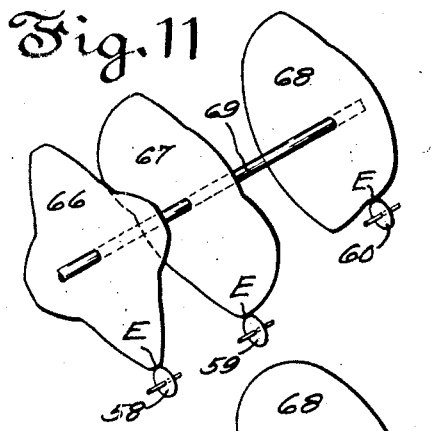
Figure 12:
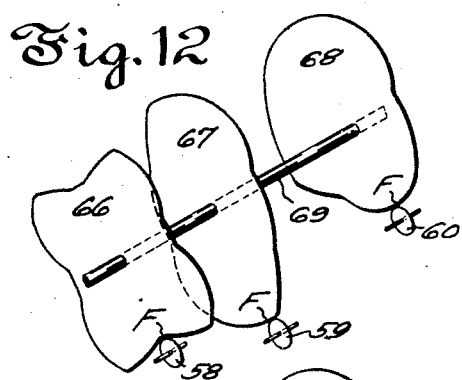
Figure 13:
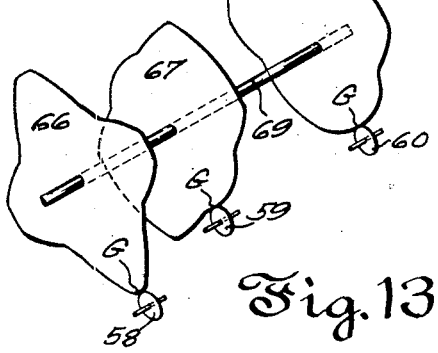
Figure 14:
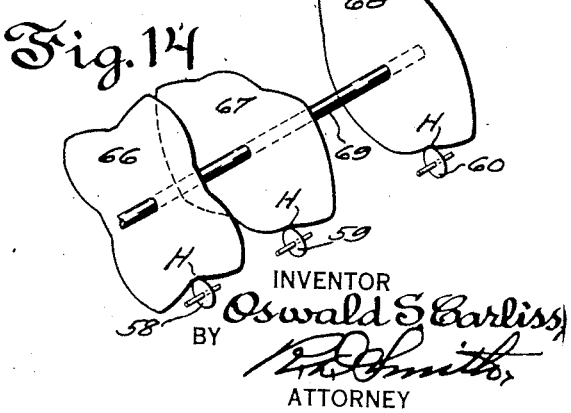
Figure 15:
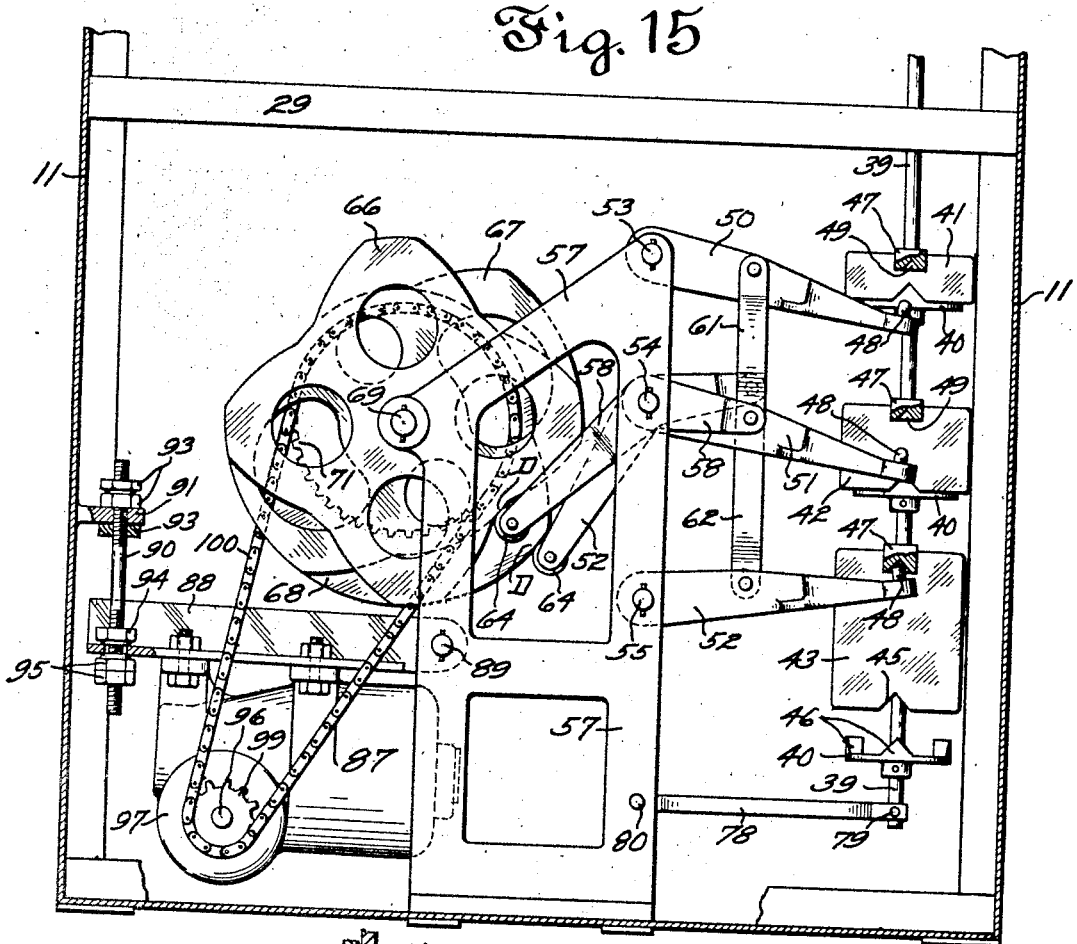

Fig. 15 shows a modification of means for operating the cams and is otherwise like Fig. 1.

Figure 16:
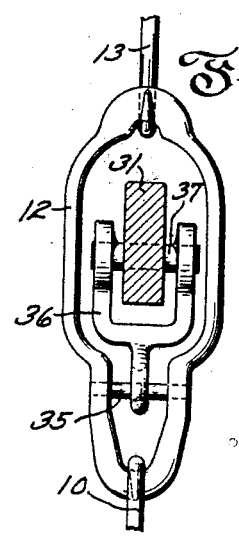

Fig. 16 is a fragmentary view taken in section on the plane 16—16 in Fig. 1.

Figure 17:
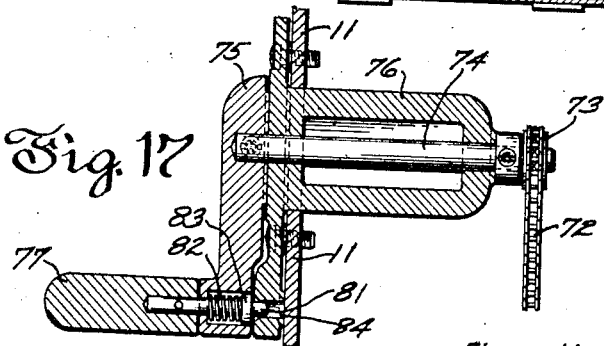

Fig. 17 is a fragmentary view taken in section on the plane 17—17 in Fig. 1.

Figure 18:
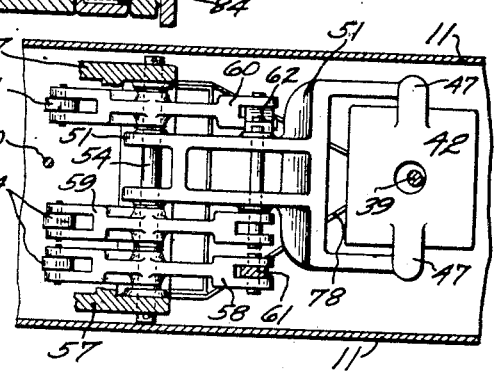

Fig. 18 is a fragmentary view taken in section on the plane 18—18 in Fig. 1.

In Fig. 1 a draft rod 10 is assumed to connect at its bottom end (not shown) with some lever system associated with the platform or other means of support (not shown) for a weighable load. Such platform is commonly located at the base of a hollow standard, as the cabinet 11. The pull of the load is assumed to be downward on draft rod 10 whose top end is coupled to a loop 12. A connecting rod 13 runs upward from loop 12 to the dial head unit designated as a whole by 14.

The dial head unit may be like that fully disclosed in U. S. Patent No. 2,083,413 granted to G. E. Weist and may consist of a casing 16 perched to swivel about a vertical axis on the cabinet 11 and carrying the dial chart 17 marked with weight designating indicia 18 swept by weight indicating pointer 19 rotatably carried on spindle 21. This pointer spindle is journaled in a frame 22 which also rotatably supports the load counterbalancing pendulums 23 that are caused to swing upward and outward responsive to the downward pull of connecting rod 13 on flexible ribbons 24 in a manner that will be clear from the disclosure in the aforesaid patent wherein there also is fully illustrated and described the mechanism 25 that transmits movement from pendulums 23 to the pointer spindle 21.

Within cabinet 11 there is fulcrumed at 27 on a stand 28 which is mounted on cross bar 29 fixed to the cabinet walls, an auxiliary balancing apparatus including a rocking tare beam structure consisting of one or more graduated beams 30 fixedly united with a lever 31 shown at the rear of the beams 30 in Fig. 1. Such apparatus and its tare beam structure commonly includes a ballast compartment 33 and also poises 34 slidably carried on the beams. Lever 31 is pivotally mounted on the fulcrum 27 and is straddled by the aforementioned loop 12 as best shown in Fig. 16. This loop contains a cross pin 35 having a grooved periphery engaged by the rounded bottom turn of a stirrup 36 whose yoke arms rest on a knife edge 37 fixed in lever 31. In this manner the tare beam structure is operatively associated with the load counterbalancing mechanism before described.

Suspended pivotally from the right extremity of the tare beam structure at 38 there is a pendant structure including the depending rod 39. At different height levels along this rod are fixed shelf-like rosettes 40 which are adapted to serve as receivers for at times supporting unit weights 41, 42 and 43. Each of these unit weights has a central vertical bore considerably larger than the rod 39 that passes through it, and the bottom surface of each unit weight contains crosswise grooves 45 which seat upon and become oriented by tapered ridges 46 upstanding from the rosettes 40 in accordance with conventional practice. Each unit weight also carries forward and rearward protruding lugs 47 in each of whose bottom surfaces there is formed a socket 49 receptive to the upstanding rounded end of a lifter post 48 fixedly carried at the end of each of the lifter or rocker arms 50, 51 and 52. Sockets 49 may be conical.

Heretofore lifter arms for unit weights have been provided to lift weights of respectively equal mass under the control of a separately operated handle for each lifter. According to the present improvements, however, the lifter arms 50, 51 and 52 are fulcrumed on vertically spaced pivotal supports at 53, 54 and 55, respectively, on a common frame 57 fixedly mounted on the base of cabinet 11. The lifter arms 50, 51 and 52 are one above another and in vertical alignment on their respective pivot shafts 53, 54 and 55, as best shown in Fig. 3. But pivot shaft 54 carries in addition to the lifter arm 51 three cam followers of which the follower 60 is positioned between lifter arm 51 and the rear of frame 57 while followers 58 and 59 are positioned at the front of lifter arm 51 between the latter and the front of frame 57. Follower 59 is pinned to and thereby made as one with lifter arm 51 so that these two parts swing in unison upon the pivot shaft 54. Follower 58 is operatively coupled to lifter arm 50 by a push link 61 pivotally connected at each of its ends. Follower 60 is operatively coupled to lifter arm 52 by a pull link 62 pivotally connected at each of its ends.

Each of followers 58, 59 and 60 consists of a bell crank having a hub freely rotatable on shaft 54 and carrying at its bottom extremity a freely turnable roller wheel 64 which rides against the edge of one of the cams of a bank of cams 66, 67 and 68, all of which are carried by and fixed to rotate in unison with the shaft 69 journaled in frame 57. The tendency of each lifter arm to drop by its own weight constantly urges the follower to which it is linked in a direction maintaining the follower wheel pressed against the cam that actuates it and thus automatically at all times takes up all looseness and play. Also fixed upon shaft 69 is a sprocket wheel 71 impellably engaged by a chain belt 72 which is driven by another sprocket wheel 73 fixed on the inner extremity of the stud shaft 74 to which is fixed a crank 75. The ratio of rotary movement of these sprocket wheels is 1 to 8. Cam shaft 69 carries the signal disc 70 fixed thereon to exhibit, one at a time, its carried markings through a window opening 85 thereby showing the rotative position and degree of displacement of the cams from starting or zero position shown in Fig. 1. The markings may be spaced at 45 degrees, or one-eighth of a turn, intervals about the disc.

Shaft 74 is journaled in a bearing block 76 lodged in the front wall of cabinet 11 as best shown in Fig. 17. The handle 77 is slidably mounted in crank 75 by means of a shank pin 81 which is fixed in the handle. The rear end of this pin is urged rearward by the tension of a spring 82 contained in a chamber in crank 75 and constantly pressing against a collar 83 fast on the shank pin. At each revolution of crank 75 when the latter is positioned as in Fig. 1, pin 81 can enter a detent hole 84 in the flange of bearing block 76 and thus serve to lock crank 75 and the cam shaft 69 against rotation. To withdraw pin 81 from hole 84 handle 77 is merely pulled forward.

In Fig. 1 it will be noted that the three pivot shafts 53, 54 and 55 are in vertical alignment and that the tare beam carried rod 39 is maintained always vertical as it rides up and down with the right end of the tare beam by the help of a steadying link 78 which is pivotally connected both to rod 39 at the point 79 and to the frame 47 at the point 80. Parallel linkage motion is thus set up which serves to maintain rod 39 always in vertical positions because fulcrum 27 for the tare beam structure and pivot 80 for the equally long steadying link 39 are in the same vertical straight line. There will also occur equal maximum amounts of lateral displacement of lifter posts 48 and sockets 49 relative to rod 39 in the arcuate movements of the ends of the lifter arms because all the pivots 27, 53, 54, 55 and 80 fall in the same vertical line and the lengths of the lifter arms are equal to the length of link 78.

Fig. 15 shows an electric power motor 87 substituted for the manually operated crank 75 of Fig. 1. Also in Fig. 15 the cam shaft 69 is shown in a changed rotative position corresponding to Fig. 10. Motor 87 is bolted to a swingably adjustable shelf 88 hinged at 89 on the frame 57. A suspension bolt 90 connects the free end of shelf 88 with a bracket 91 fixed on the cabinet wall. Bolt 90 has threaded engagement with bracket 91 and is held in fixed relation thereto by lock nuts 93. Bolt 90 passes through a clearance hole in shelf 88 and carries a clamp nut 94 at the top of the shelf together with lock nuts 95 beneath the shelf. Lock nuts 93 may always remain tight. When it is desired to vary the center distance between the power shaft 96 and the cam shaft 69, nuts 94 and 95 may be loosened, permitting shelf 88 to be adjustably swung up or down after which all nuts will again be tightened against the shelf. In Fig. 15 shaft 96 is assumed to be driven by the armature of motor 87 through reduction gearing contained in the gear case 97. A sprocket wheel 99 is fixed on shaft 96 and serves by means of the chain belt 100 to drive the sprocket wheel 71 fixed on cam shaft 69. This chain may be tightened, loosened or removed by tilting shelf 88 about its hinge 89.

As an example of the operation of the manipulative form of improved unit weight handling apparatus hereinbefore described, it will be assumed that the three unit weights 41, 42 and 43 are of such different sizes that the top unit weight 41 possesses a mass proportional to one unit of load counterbalancing effect, the middle unit weight 42 possesses a mass value proportional to two such units, and the lowest unit weight 43 possesses a mass value proportional to four such units. The load counterbalancing effect of a single such unit may be arbitrary, as for instance, one thousand pounds. Since the total load counterbalancing effect of all unit weights which are placed in use is equal to the sum of their individual unit effects, Figs. 7 to 14, inclusive, show that each one-eighth revolution of the fixedly united cams 66, 67 and 68 so places different unit weights, or different sets thereof, in operation that there results a distinct and different total or additive load counterbalancing effect at each said one-eighth revolution of the cams. The resultant effect will be clear from the following table:

| Position of cams | Places these unit weights in use | Total load counterbalancing effect |
| --- | --- | --- |
| Starting position (Fig. 7) | None | None |
| Advanced ⅛ turn (Fig. 8) | No. 41 | 1 unit |
| Advanced ¼ turn (Fig. 9) | No. 42 | 2 units |
| Advanced ⅜ turn (Fig. 10) | Nos. 41 and 42 | 3 units |
| Advanced ½ turn (Fig. 11) | No. 43 | 4 units |
| Advanced ⅝ turn (Fig. 12) | Nos. 41 and 43 | 5 units |
| Advanced ¾ turn (Fig. 13) | Nos. 42 and 43 | 6 units |
| Advanced ⅞ turn (Fig. 14) | Nos. 41, 42 and 43 | 7 units |
| Advanced whole turn (Fig. 7) | None | None |

Consequently by turning crank handle 75 an additional full turn for each desired one-eighth revolution of cams any one of the differing combination effects diagrammed in Figs. 7 to 14, inclusive, can be produced, it being understood that the correspondingly lettered peripheral points A, B, C etc. on each cam in Figs. 4, 5 and 6 are at any given instant simultaneously engaged by all three roller wheels of followers 58, 59 and 60. The amount of vertical lifting movement imparted to each unit weight by its lifter arm exceeds the normal extent of up and down movement of rod 39 resulting from rocking of the tare beam structure. This precludes any interference between the rosettes and any unit weight that is intended to be lifted out of operation in the weighing system.

From the foregoing it is clear that as many as eight different counterbalancing effects are accomplished by the use of only three unit weights and that this result is made possible by the principles of cam operated lifter control illustrated. All of this control is exerted through a single or unitary form of actuator that may be manipulated by a single operating handle and the apparatus is greatly simplified and condensed in comparison with any usual unit weight handling apparatus capable of producing as many different load counterbalancing effects. A distinguishing feature is found in the ability of this single operating handle to cause different sets of unit weights to come into operation in the weighing system by varying the sequence in which the depositing or withdrawal of different unit weights precedes or follows the depositing or withdrawal of other unit weights. The separate cam surfaces, cam followers, and links connecting them to the unit weight lifting rocker arms may be regarded as motion transmitting devices which serve to convert progressive advance movement of the unitary actuator into oscillatory movement of the weight lifting rocker arms in a manner to shift different combinations of the unit weights to and away from the support of the vertically distributed weight receiving means on pendant rod 39.

In Fig. 15 the power motor 87 is preferably of the reversible drive type so that by means of a conventional electric current reversing switch (not shown) the running of the motor can be started in either direction and stopped at will all from a remote point thereby to position the bank of cams selectively in any one of the positions shown in Figs. 7 to 14, inclusive. Remote indicating means of telemetric nature or otherwise may be employed to inform a distant operator what capacity changing application of unit weights has been made to the scale. Such indication according to these improvements requires only that there be indicated the rotative position of cam shaft 69 as may be done by the disc 70 cooperative with window 85.

As an example, the normal weighing capacity of the scale with all unit weights removed as in Fig. 1 may be one thousand pounds. A load of thirty-five hundred pounds is to be weighed. Handle 77 will be pulled forward and crank 75 then turned three complete revolutions whereupon pin 81 will again enter and interlock with detent hole 84. All cams have thereby been rotated three eighths of a complete revolution clockwise and each follower wheel 64 is against the spot D on the cam which it follows. See Figs. 4, 5, 6, 10 and 15. Only unit weights 41 and 42 are thus let into operation, unit weight 43 alone remaining held out of operation or in lifted position by cam 68. As a result, three thousand pounds of the total thirty-five hundred pounds of the load will result in no movement of pointer 19 away from zero, as is indicated by the indicium 3000 which signal disc 70 will now exhibit in window 85, whereas five hundred pounds of the total load will be left to be counterbalanced by the lifting action of pendulums 23 which action will swing pointer 19 into register with indicium 500 on the dial chart 17. The operator will add to the registered 500 pounds the 3000 pound counterbalancing effect of the combined unit weights 41 and 42 registered in window 85 and thereby know that the total load weight is 3500 pounds. Various forms of apparatus for registering remotely the indications of pointer 19 and disc 70 may be provided to inform a distant operator of these readings of weight indication.

Having thus described and illustrated one of many forms in which the invention may be embodied, I intend the appended claims to be directed to and cover all equivalents of and known substitutes for the particular methods, parts and arrangements herein disclosed that shall come within the fair meaning of the language of each of the claims.

I claim:

1. In a weighing scale having normal load counter-balancing mechanism, unit weight apparatus for increasing the weighing capacity of the scale, including in combination with auxiliary balancing instrumentalities operatively associated with said mechanism, a plurality of unit weights, receivers carried by said instrumentalities arranged in a vertical row and affording supports for said unit weights, a plurality of weight lifting arms constructed and arranged to be moved in a path to deposit and remove said unit weights with respect to said receivers, a control handle, cams arranged in a horizontal row connected to be rotated by said control handle, and cam followers respectively connected to said lifting arms in a manner to raise the latter and be weighted respectively thereby in a direction to be urged constantly and respectively against said cams.

2. In a weighing scale, the combination with normal load counterbalancing mechanism, of unit weight regulating apparatus for varying the normal weighing capacity of the scale comprising, a beam fulcrumed and operatively connected to be tiltable by said mechanism, a vertically elongated pendant structure suspended from said beam, a plurality of transferable unit weights, receivers affording support respectively for said unit weights carried by said structure in vertical alignment, a capacity changing actuator movable through selective portions of a full range of capacity changing movement, and separate instrumentalities including members operative upon said unit weights extending to locations at different levels one above another operably related to said actuator in a manner to be shifted separately thereby into various mutual relationships responsive to movement of said actuator through respectively different said portions of its full range of movement, said members operating in said different relationships to deposit different combinations of said weights upon said receivers.

3. In a weighing scale the combination with normal load counterbalancing mechanism of, unit weight regulating apparatus for varying the normal weighing capacity of the scale including the combination of, a beam supported and operably connected to be tiltable by said mechanism, a vertically elongated pendant structure suspended from said beam, a plurality of transferable unit weights, receivers affording supports respectively for said unit weights carried by said structure one above another in common vertical alignment, a single capacity changing actuator, and separate instrumentalities operable by said actuator and operative to deposit and remove said unit weights with respect to at least two of said receivers, said instrumentalities including a plurality of cams arranged horizontally side by side, a plurality of cam followers arranged horizontally side by side, and a plurality of unit weight lifters operatively connected respectively to said cam followers and located one above another.

4. In a weighing scale the combination with load counterbalancing mechanism of, unit weight regulating apparatus for varying the normal weighing capacity of the scale including the combination of, a beam supported and operably connected to be tiltable by said mechanism, a vertically elongated pendant structure suspended from said beam, a plurality of transferable unit weights, receivers affording supports respectively for said unit weights carried by said structure one above another in common vertical alignment, a single capacity changing actuator, separate instrumentalities extending to superimposed locations in vertical columnar relationship constructed and arranged to be shifted into different positions relative to one another by respectively different extents of movement of said actuator to deposit and remove said unit weights with respect to at least two of said receivers, said instrumentalities including a bank of cams arranged to turn as a unit, and a rotatable register connected in positive rotative relation to said bank of cams in a manner to insure movement of said register proportionate to movement of said cams.

5. In a weighing scale the combination with normal load counterbalancing mechanism of, unit weight regulating apparatus for varying the normal weighing capacity of the scale including the combination of, a beam supported and operably connected to be tiltable by said mechanism, a vertically elongated pendant structure suspended from said beam, a plurality of transferable unit weights, receivers affording supports respectively for said unit weights carried by said structure one above another in common vertical alignment, a single capacity changing actuator, and separate instrumentalities operable by said actuator operative to deposit and remove said unit weights with respect to at least two of said receivers, said instrumentalities including a horizontal row of coaxial cams, a horizontal row of cam followers, a vertical row of unit weight lifters, and separate links respectively connecting said lifters to said cam followers.

6. In a weighing scale, the combination with normal load counterbalancing mechanism of, unit weight regulating apparatus for varying the normal weighing capacity of the scale comprising, a beam fulcrumed and operatively connected to be tiltable by said mechanism, a vertically elongated pendant structure suspended from said beam, a plurality of transferable unit weights, receivers affording support respectively for said unit weights carried by said structure in vertical alignment, a capacity changing actuator movable through selective portions of a full range of capacity changing movement, and separate instrumentalities including a plurality of pivotally supported swingable members located one above another operative on said unit weights and operably related to said actuator in a manner to be shifted separately thereby into various mutual relationships responsive to and determined by movement of said actuator through respectively different said portions of its full range of movement, said members operating in said different relationships to deposit different combinations of said weights upon said receivers.

7. In a weighing scale, the combination with normal load counterbalancing mechanism of, unit weight shifting apparatus for varying the normal weighing capacity of the scale including, a beam fulcrumed and operatively connected to be tiltable by said mechanism, a vertically elongated pendant structure suspended from said beam, a plurality of shiftable unit weights, unit weight receiving means carried by said pendant structure adapted to support various combinations of said unit weights one above another, separate rocker arms constructed and arranged to lower and lift respectively different unit weights in a manner to shift the latter to and away from the support of said receiving means, stationary fulcrums located at vertically spaced heights respectively supporting said arms, actuating instrumentalities including plural cam surfaces operatively connected to advance simultaneously through selective partial extents of a full range of capacity changing movement, and differentally movable devices for transmitting motion from said cam surfaces to said rocker arms, said devices operatively relating said rocker arms respectively to said actuating instrumentalities in a manner to cause said rocker arms to oscillate into differing relationships determined by respectively different extents of progressive movement of said cam surfaces, thereby on different occasions to deliver various unit weights selectively to the support of various receiving means.

8. In a weighing scale, the combination defined in claim 7, in which the said differentially movable devices include separate rocking followers for the said cams, each of said followers being operatively related to a different one of the said rocker arms, and one of said followers being fulcrumed on a common pivotal axis with the rocker arm to which it is operatively related.

9. In a weighing scale, the combination with normal load counterbalancing mechanism, of unit weight regulating apparatus for varying the normal weighing capacity of the scale comprising, a beam fulcrumed and operatively connected to be tiltable by said mechanism, a vertically elongated pendant structure suspended from said beam, a plurality of transferable unit weights carried by said structure in a vertically distributed group, receivers affording support respectively for said unit weights, a single actuator movable through selective portions of a full range of capacity changing movement, and separate instrumentalities including members operative upon said unit weights extending to vertically distributed locations at different levels and operably related to said actuator in a manner to be shifted separately thereby into various mutual relationships responsive to movement of said actuator through respectively different said portions of its full range of movement, said members operating in said different relationships to deposit various weights selectively upon various receivers.

OSWALD S. CARLISS.